United States Patent
Lombardi et al.

(10) Patent No.: US 9,614,949 B2
(45) Date of Patent: Apr. 4, 2017

(54) WIFI CONNECTIVITY IN A MODULAR PORTABLE CELLULAR DEVICE

(71) Applicant: Motorola Mobility LLC, Chicago, IL (US)

(72) Inventors: Michael J Lombardi, Lake Zurich, IL (US); Mohammed Abdul-Gaffoor, Palatine, IL (US); Joseph L Allore, Mundelein, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/663,716

(22) Filed: Mar. 20, 2015

(65) Prior Publication Data

US 2016/0277558 A1    Sep. 22, 2016

(51) Int. Cl.
*H04M 1/72* (2006.01)
*H04M 1/725* (2006.01)
*H04W 76/02* (2009.01)

(52) U.S. Cl.
CPC ..... *H04M 1/72527* (2013.01); *H04M 1/7253* (2013.01); *H04W 76/023* (2013.01); *H04M 2250/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,625,673 A | * | 4/1997 | Grewe | G06F 1/1626 379/428.03 |
| 8,655,288 B2 | * | 2/2014 | Khan | H04W 88/02 455/101 |
| 8,792,838 B2 | * | 7/2014 | Yamada | H04B 7/0697 455/101 |
| 9,014,646 B2 | * | 4/2015 | Khan | H04W 88/02 455/101 |
| 2009/0111533 A1 | * | 4/2009 | Johansson | H01R 13/502 455/575.1 |
| 2010/0317294 A1 | * | 12/2010 | McEwen | H04M 1/0254 455/66.1 |

OTHER PUBLICATIONS

Michael J. Lombardi, et al., "Antenna Tuning in a Modular Portable Communication Device", U.S. Appl. No. 14/625,682, filed Feb. 19, 2015.
Michael J. Lombardi, et al., "Remote Imaging in Modular Cellular Phone", U.S. Appl. No. 14/663,521, filed Mar. 20, 2015.
Michael J. Lombardi, et al., "Voice Call Management in a Modular Smartphone", U.S. Appl. No. 14/688,361, filed Apr. 6, 2015.
Michael J. Lombardi, et al., "Adaptive Audio in Modular Portable Electronic Device", U.S. Appl. No. 14/737,990, filed Jun. 12, 2015.

* cited by examiner

*Primary Examiner* — Junpeng Chen
(74) *Attorney, Agent, or Firm* — Miller, Matthias & Hull LLP (57) ABSTRACT

A system and method of networking in a portable device in a modular device environment detects connection of a second device to the portable device, and configures the second device to form a parallel network connection with the portable device. In an embodiment, the second device is configured to form a direct WiFi connection to the portable device when the devices are separated.

19 Claims, 7 Drawing Sheets

WIFI CONNECTIVITY IN A MODULAR PORTABLE CELLULAR DEVICE

TECHNICAL FIELD

The present disclosure is related generally to mobile device communications, and, more particularly, to a system and method enabling WiFi connectivity with respect to a modular portable communication device.

BACKGROUND

While modern portable electronic devices are highly capable, the average user does not use all, or even most, of the capabilities that their device possesses. When this realization is coupled with the fact that users continue to ask for lighter devices, a modular approach may be seen as one solution to provide a customized experience. In a modular approach, each user's device is customized, via add on modules, to support the extended functions that that user desires.

In this model, a light and thin base cellular device is provided having certain basic functions such as phone, text, WiFi, email and basic sound and photo capabilities. Add-on modules can be docked to the base device to add more powerful features or sets of features. For example, a more professional camera module can be used to extend the basic photo abilities of the base module. Similarly, an audio module may be added to enable better sound quality as compared to the basic speaker system built into the base device.

However, even with a customized modular phone, it is still beneficial to use space and weight efficiently. For example, both the base device and the add-on module may have light devices, with light networking equipment and capabilities. However, the combined device can have twice the weight in networking components without necessarily doing a better job of networking than the stand-alone devices. As such, the inventors consider improved WiFi functionality in a modular system to be desirable.

While the present disclosure is directed to a system that can eliminate certain shortcomings noted in this Background section, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize the art in the public domain.

As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a full discussion of the disclosed principles, an overview of certain embodiments is given to aid the reader in understanding the later discussion. The modular device design exemplified herein includes a first module (the first device) and a second module (e.g., an additional function second device). The first device may comprise a display, touchscreen, battery, processor, memory, a WiFi transceiver, and a WiFi antenna. The second device includes, for example, a battery, processor, memory, as well as a WiFi transceiver and a WiFi antenna. The second device is able to dock to the first device through both mechanical and electrical connections.

When undocked, the two independent devices are capable of maintaining independent connections to a WiFi network. When docked, the combined device is able to use the WiFi antennas and transceivers on each device as a MIMO (multiple input, multiple output) antenna system such that data throughput to and from the combined device is greater than it would be to either device alone.

The first device may have one or more WiFi networks and associated passcodes stored. In an embodiment, when the devices are docked together, the saved WiFi networks and passcodes on the first device are automatically transferred to the second device, such that when the devices are later undocked, the second device is able to connect to the same WiFi networks without needing instructions or passcodes.

In a further embodiment, the first device and the second device may establish a direct wireless connection using the WiFi antenna on each device such as WiFi Direct such that data may be wirelessly transferred between the two devices. In this way, when physically disconnected, or undocked, the two devices remain in direct communication with each other. The WiFi Direct connection may be created by either device, and may be automatically initiated by a user action such as launching an app or simply undocking the two devices.

With this overview in mind, and turning now to a more detailed discussion in conjunction with the attached figures, the techniques of the present disclosure are illustrated as being implemented in a suitable computing environment.

The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to personal computers, tablet computers and other devices.

Figure 1:
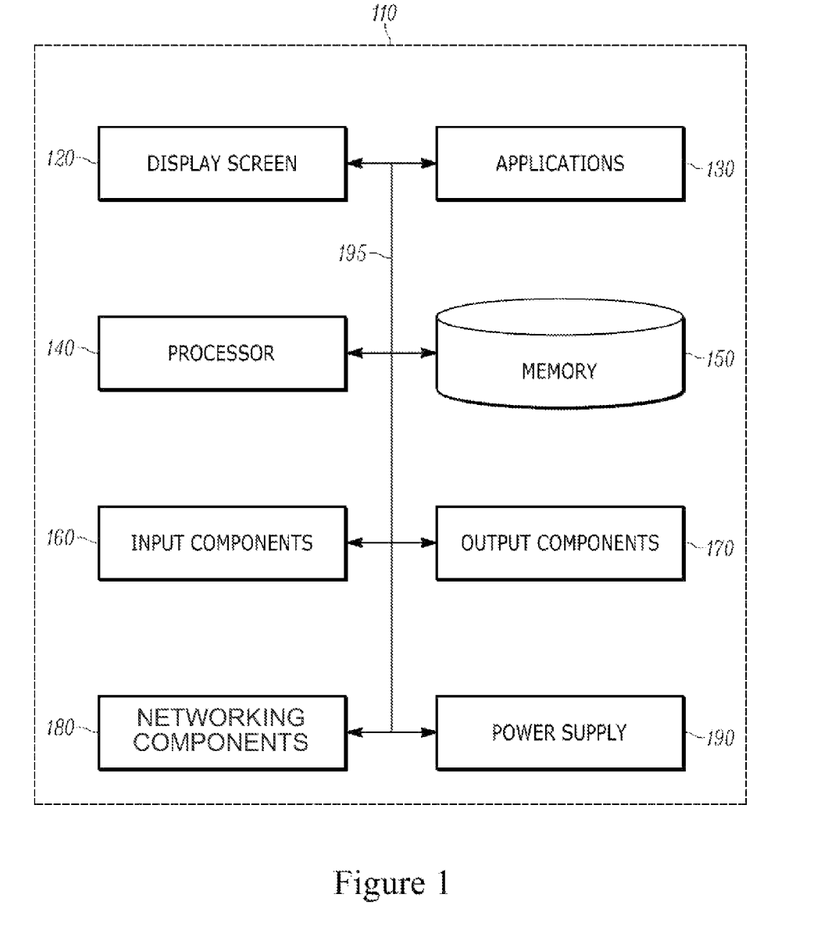
FIG. 1 is a simplified schematic of an example device with respect to which embodiments of the presently disclosed principles may be implemented.

The schematic diagram of FIG. 1 shows an exemplary component group 110 forming part of an environment within which aspects of the present disclosure may be implemented. In particular, the component group 110 includes exemplary components that may be employed in a device corresponding to the first device and/or the second device. It will be appreciated that additional or alternative components may be used in a given implementation depending upon user preference, component availability, price point, and other considerations.

In the illustrated embodiment, the components 110 include a display screen 120 (e.g., a touch screen), applications (e.g., programs) 130, a processor 140, a memory 150, one or more input components 160 such as speech and text input facilities, and one or more output components 170 such as text and audible output facilities, e.g., one or more speakers.

The processor 140 may be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device having component group 110 may include software and hardware networking components 180 to allow communications to and from the device. Such networking components 180 will typically provide wireless networking functionality, although wired networking may additionally or alternatively be supported. In an embodiment, the networking components 180 include a WiFi transceiver, and a WiFi antenna.

In an embodiment, a power supply 190, such as a battery or fuel cell, may be included for providing power to the device and its components 110. All or some of the internal components 110 communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications).

Figure 2:
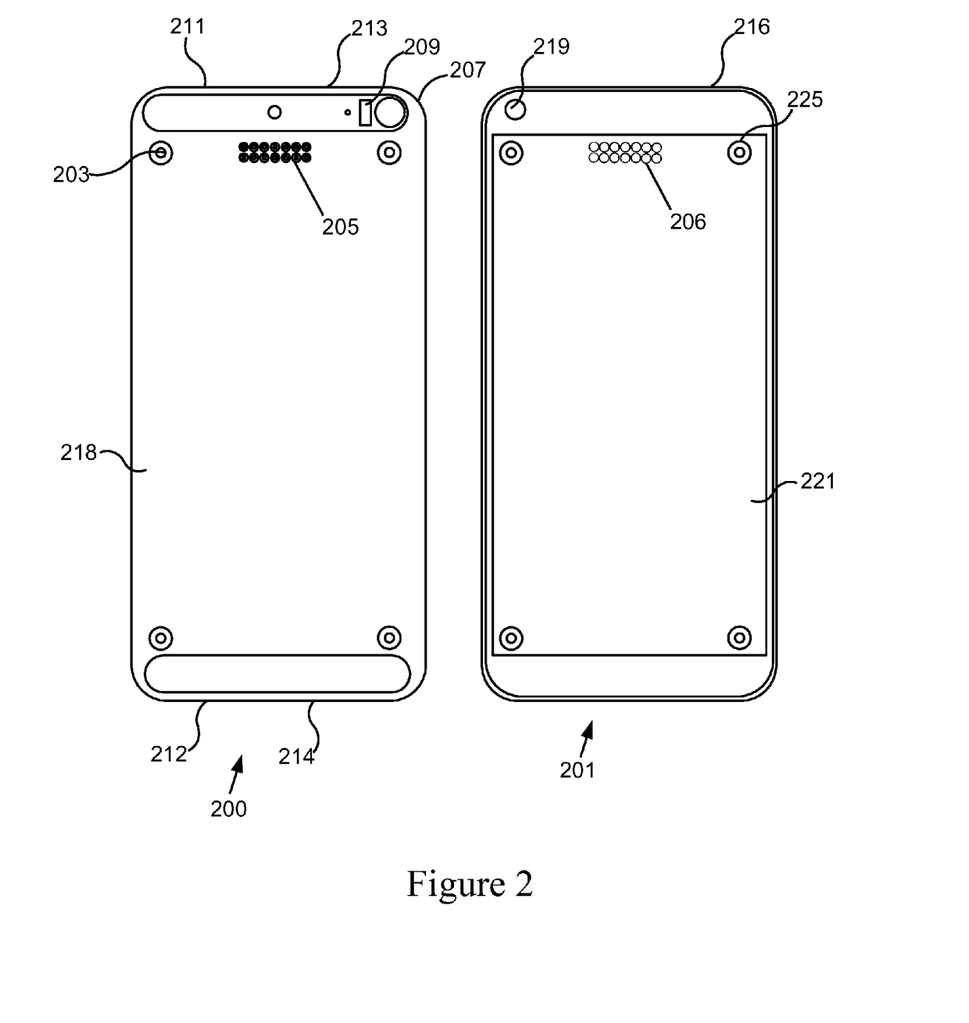
FIG. 2 is view of a first device and a second device (sometimes referred to herein as a "portable function module") showing the back of the first device and the front of the second device in accordance with an embodiment of the disclosed principles.

Turning to FIG. 2, this figure presents a view of a first device and a second device, showing the back 216 of the first device and the front 221 of the second device in accordance with an embodiment of the disclosed principles. In the illustrated example, the back 216 of the first device 200 includes one or more alignment features 203 configured and placed to mate with mating features 225 on the front 221 of the second device 201.

In addition, the back 216 of the first device 200 in the illustrated embodiment includes a connector array 205. The connector array 205 is located and configured to mate with a mating connector array 206 on the front 221 of the second device 201. The top of the first device 200 includes a first antenna 211 and a second antenna 213 and the bottom of the first device 200 includes a third antenna 212 and a fourth antenna 214. Similarly, the second device 201 includes one or more antennas 216.

In the illustrated embodiment, the back of the first device 200 further includes a built-in camera 207 and an associated flash 209. It will be appreciated that the first device 200 may include different features or additional features as compared to the illustrated embodiment.

In the illustrated example, the second device 201 may provide an enhanced camera function. To this end, the second device 201 includes on its back face (not shown in FIG. 2) a camera and an associated flash. Further, in the illustrated example, docking of the second device does not preclude the use of the camera 207 of the first device 200. As such, a hole 219 is provided in the second device 201 to allow a sight line for the camera 207 of the first device 200.

Figure 3:
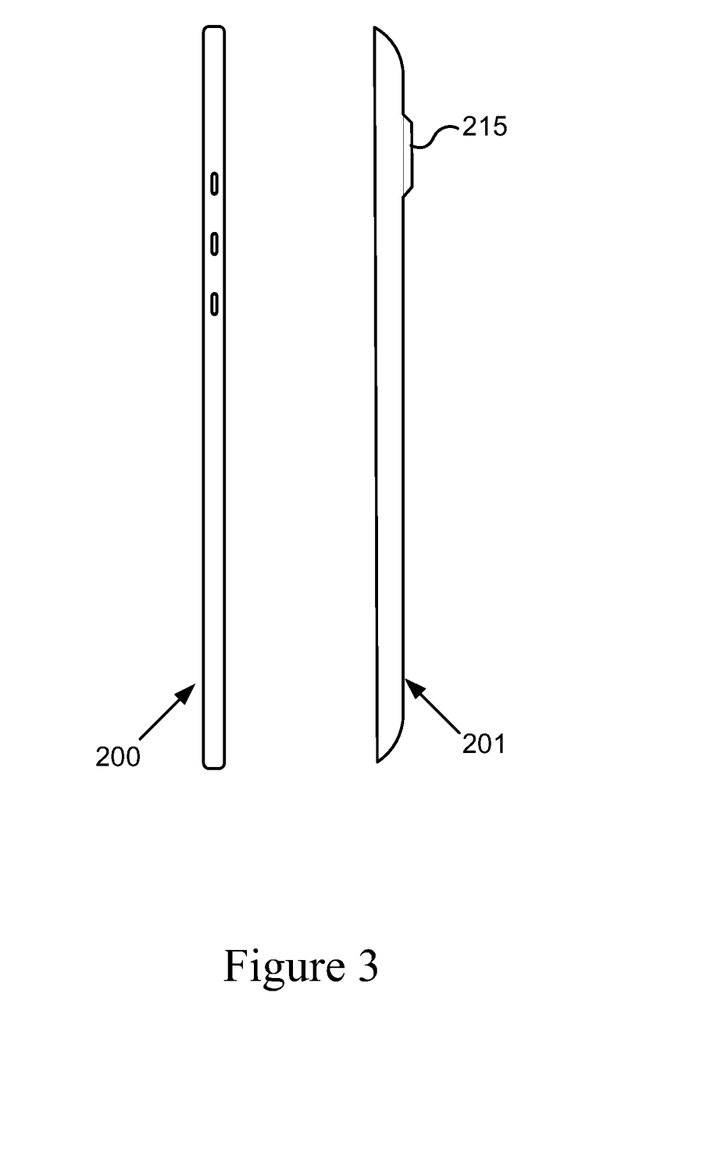
FIG. 3 is side view of the first device and the second device in accordance with an embodiment of the disclosed principles.
Figure 4:
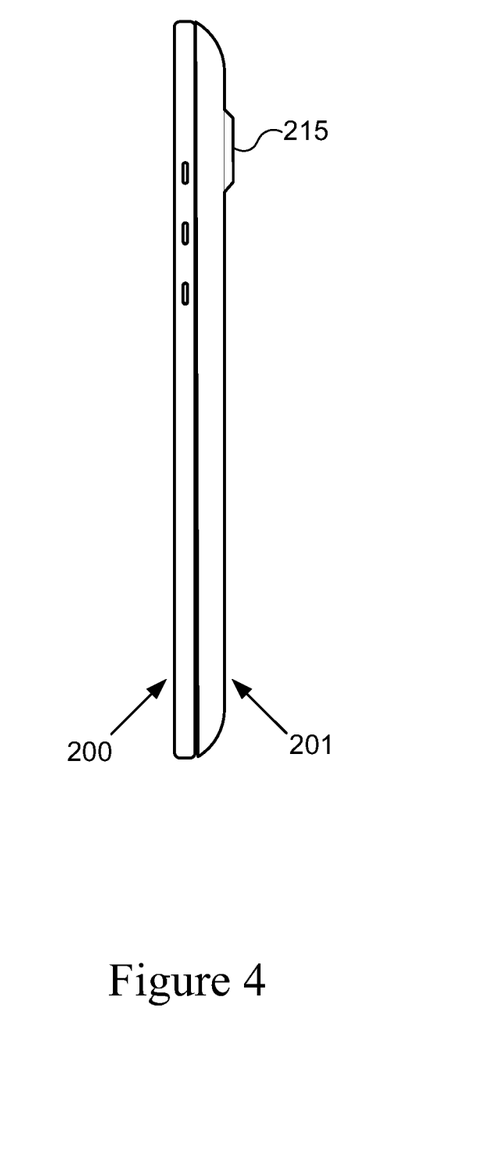
FIG. 4 is side view of the first device and the second device mated together via the backs of the devices in accordance with an embodiment of the disclosed principles.

FIG. 3 is a side view of the first device 200 and the second device 201, not yet mated together, showing the camera 215 on the back of the second device 201. Continuing, FIG. 4 is a side view of the first device 200 and the second device 201 mated together at the back of the first device 200 and the front of the second device 201 in accordance with an embodiment of the disclosed principles. As can be seen, the respective back 216 of the first device 200 and the front 221 of the second device 201 are in physical contact or at least closely adjacent when the devices are mated. In should be noted that different embodiments of the second device 201 may vary significantly in thickness and shape from the illustrated embodiment.

When the second device 201 is attached to the first device 200, the first device 200 reads device networking data from the second device 201. The device networking data of the second device 201 may be transmitted as data, as coded data that is decodable via a key, or as an index, coded or otherwise, into a data structure such as a table. Based on the device networking data of the second device 201, the first device 200 configures the WiFi transceivers of both devices 200, 201 to cooperate and improve the performance of the combined device during the time that the second device 201 remains attached to the first device 200.

In an embodiment, the device 200 controls the WiFi transceivers of both devices 200, 201 to form a MIMO antenna system. In this way, the data throughput for the combined device may be greater than for either device 200, 201 alone. In addition, when the devices are docked together, the first device 200 may automatically transfer saved WiFi network IDs and passcodes to the second device 201. In this way, when the devices 200, 201 are later undocked, the second device 201 is able to connect to the same WiFi networks without requiring further instructions or passcodes.

Moreover, the first device 200 may configure the devices 200, 201 to behave in a certain manner upon undocking. For example, in an embodiment, the devices 200, 201 are configured such that in response to undocking of the devices 200, 201, the devices 200, 201 establish a direct wireless connection using the WiFi antenna on each device. An example of such a connection is a WiFi Direct connection. Via the direct wireless connection, data may be wirelessly transferred between the two devices. In this way, when physically disconnected, or undocked, the two devices remain in direct communication with each other. The direct wireless connection may be created by either device, and may be automatically initiated by a user action such as launching an app or undocking the two devices 200, 201.

Figure 5:
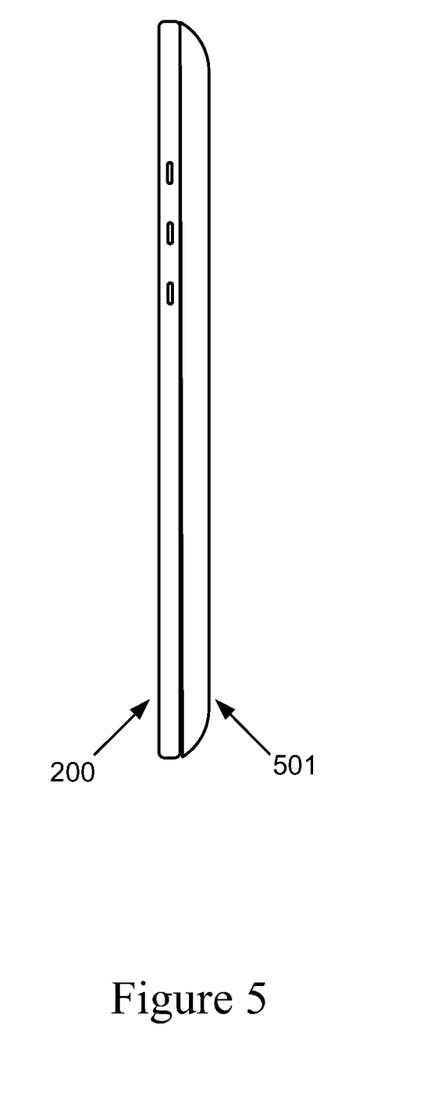
FIG. 5 is side view of the first device and a third device mated together via the back of the first device and the front of the third device in accordance with an embodiment of the disclosed principles.

FIG. 5 shows the first device 200 mated to an alternative second device 501. The alternative second device 501 is similar to the second device 201 but lacks a camera. The alternative second device 501 may also incorporate one or more other features not found on the second device 201.

Figure 6:
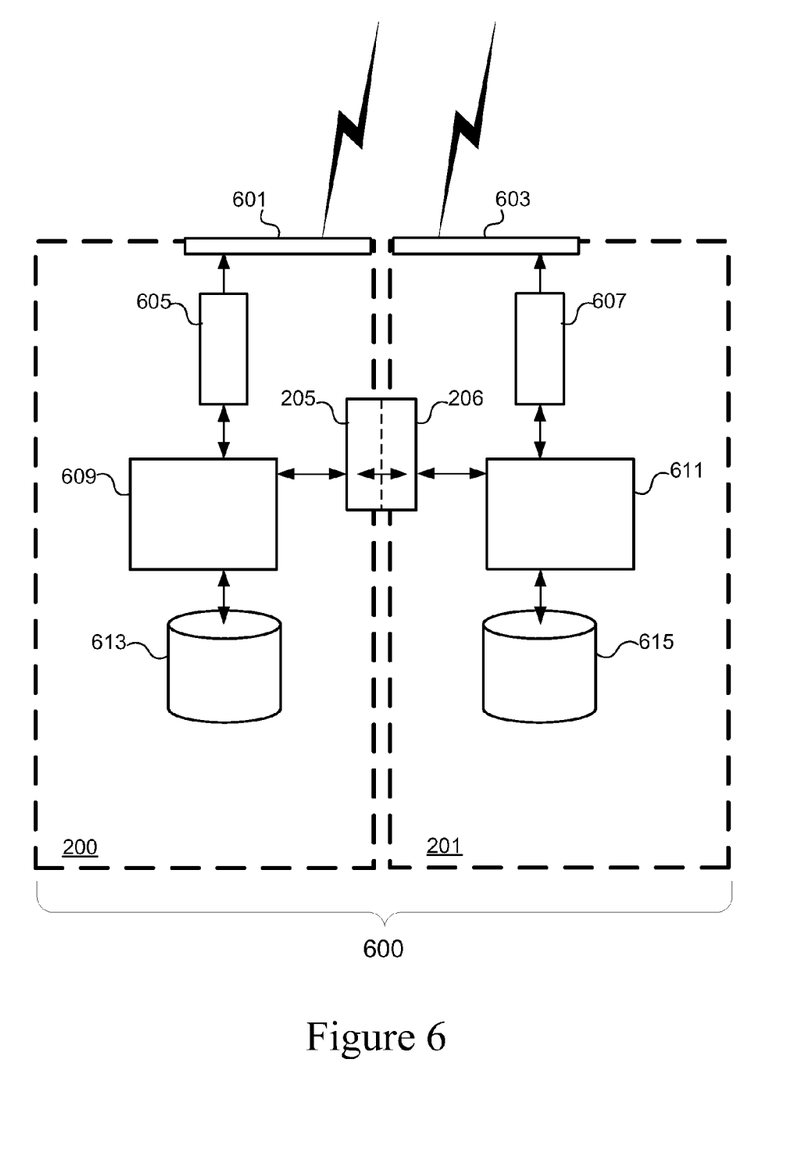
FIG. 6 is a circuit schematic showing relative electrical relationships between system components in accordance with an embodiment of the disclosed principles.

While FIG. 1 illustrated the component makeup of a device within which various embodiments may be implemented, and FIGS. 2-5 illustrated certain physical attributes and arrangements of exemplary devices, FIG. 6 provides a schematic level view of the device system 600 itself. In the illustrated system 600, in keeping with an embodiment of the disclosed principles, the first device 200 and second device 201 are both shown having at least first and second WiFi antennas 601, 603 respectively and first and second WiFi transceivers 605, 607 respectively.

In the illustrated configuration, the second device 201 is docked to the first device 200, and the devices 200, 201 are thus in electrical communication with each other via their respective connector arrays 205, 206. A controller 609, 611, which may be the same as, or implemented by, the device processor 140, is linked to each WiFi transceiver 605, 607 respectively in the first device 200 and second device 201.

In operation, the controller 609 of the first device 200 detects the attachment of the second device 201, and requests and receives from the second device 201 the device network data. After resolving the received device network data, the first device 200 configures the second device 201 via its controller 611 to optimize the network throughput of the combined device 600. As part of resolving and/or decoding the received device network data, the controller 609 of the first device 200 may reference or retrieve information from a local memory resource 613 (e.g., memory 150 of FIG. 1). The second device 201 may also have a local memory resource 615.

In the configuration shown in FIG. 6, the first device 200 has configured the second device 201, and in particular the transceiver 607 of the second device 201, to cooperate with the first transceiver 205 in forming a parallel data path to increase throughput of the combined device 600. This parallel path may operate as a MIMO (multiple input, multiple output) antenna system for example.

When the second device 201 becomes undocked from the first device 200, the respective connector arrays 205, 206 become disconnected. In this case, the devices 200, 201 are no longer able to communicate initially. However, in an embodiment, the first device 200 has configured the second device 201 to initiate or confirm a direct wireless connection via its WiFi antenna 603 to the WiFi antenna 601 of the first device 200.

Figure 7:
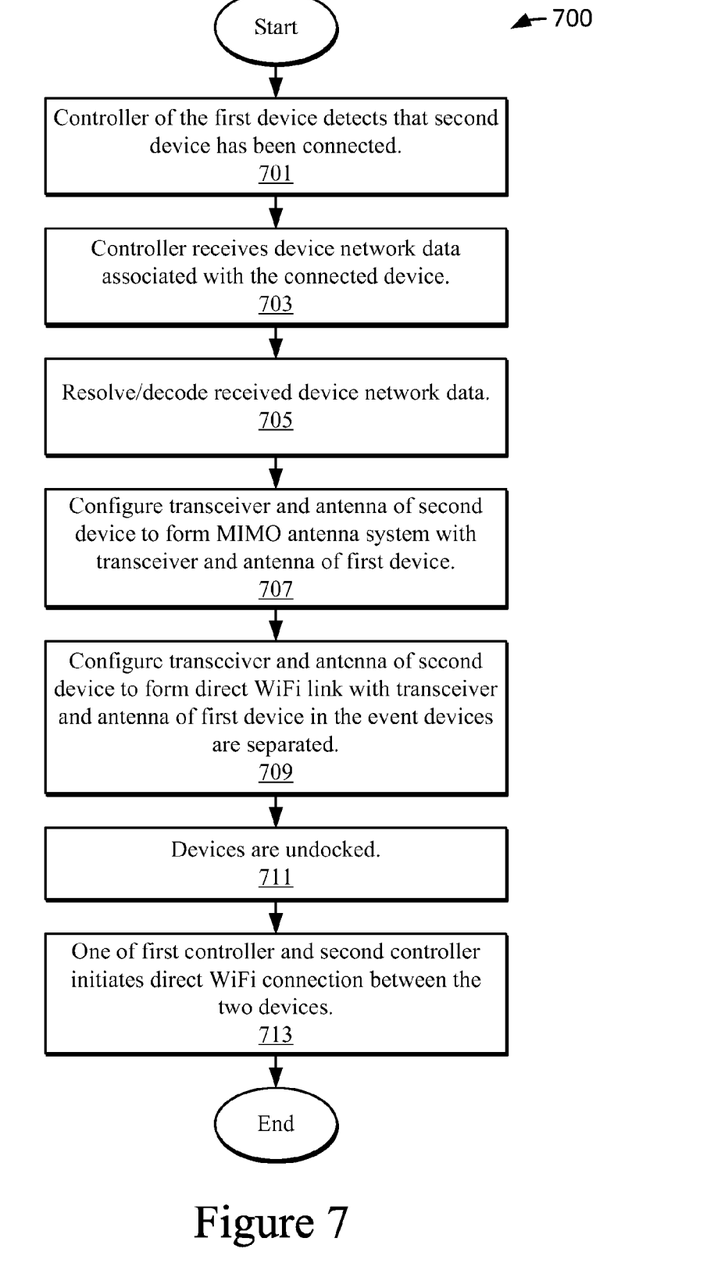
FIG. 7 is a flow chart showing an example process of WiFi collaboration in accordance with an embodiment of the disclosed principles.

Continuing, FIG. 7 depicts an exemplary process 700 for WiFi collaboration in a modular portable device such as device 200. At stage 701 of the process 700, the controller 605 of the first device 200 detects that a second device, for example device 201, has been connected to the first device 200. This detection may be made, for example, by detecting the connection of the mating contacts on the two devices 200, 201.

At stage 703 of the process 700, the controller 605 receives the device network data associated with the connected device 201, e.g., via the mating contacts 205, 206 of the devices 200, 201. The received device network data is resolved or decoded at stage 705. As noted above, the received device network data contains information sufficient to allow the first device 200 to communicate with and configure the WiFi components (transceiver 607, antenna 603) of the second device 201.

Thus at stage 707, the controller 605 of the first device 200 configures the transceiver 607, antenna 603 of the second device 201 to form a MIMO antenna system with the transceiver 605 and antenna 601 of the first device 200. This will generally improve the throughput of the combined device 600 by effectively providing parallel but related network paths. At stage 709, the controller 605 of the first device 200 configures the transceiver 607, antenna 603 of the second device 201 to form a direct WiFi link with the transceiver 605 and antenna 601 of the first device 200 in the event the devices 200, 201 are separated.

If the devices 200, 201 are then undocked at stage 711, one of the first controller 605 and the second controller 607 initiates a direct WiFi connection between the two devices 200, 201 at stage 713 in keeping with the configuration executed by the first controller 605 at stage 709. In this way, and data communications between the first device 200 and the second device 201 will be interrupted, if at all, only momentarily. It should be noted that one or both devices 200, 201 may continue other network communications as well when the devices are separated as long as other network connections are available. Such other connections may be cellular, WiFi, short range wireless and so on.

In an embodiment, the direct WiFi connection formed in stage 713 is terminated when a third device is docked to the first device 200, although such is not a requirement of every embodiment. Indeed, in an alternative embodiment, the direct WiFi connection between the devices 200, 201 is maintained even after another device is docked to the first device 200.

Moreover, although the process 700 encompasses both a parallel network connection when the devices are physically connected and a direct WiFi connection when the devices are disconnected, both are not required of every embodiment. For example, in an embodiment, the first device 200 configures the second device to form a MIMO antenna system with the transceiver 605 and antenna 601 of the first device 200 while the devices 200, 201 are physically docked together, without establishing a direct WiFi connection when the devices 200, 201 are separated. Similarly, in an embodiment, the first device 200 configures the second device to establish a direct WiFi connection when the devices 200, 201 are separated, but does not configure the behavior of the devices for the situation when the devices 200, 201 are connected.

It will be appreciated that a system and method for antenna and transceiver configuration for a modular portable device has been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A portable electronic device, the portable electronic device comprising:
   a display and an interconnect array to electrically connect the portable electronic device to a portable function module;
   at least one device antenna and at least one device transceiver configured to transmit and receive signals via the device antenna; and
   a controller configured to detect docking of a portable function module to the portable electronic device, receive device network information from the portable function module, transmit WiFi network information including at least one WiFi network passcode to the docked portable function module, and configure at least one module transceiver driving at least one module antenna on the portable function module to form a parallel radio frequency (RF) connection with the portable electronic device to increase network throughput over that of the portable electronic device alone.

2. The portable electronic device in accordance with claim 1, wherein the parallel connection is a WiFi connection.

3. The portable electronic device in accordance with claim 1, further comprising a connector array exposed on an outside surface of the portable electronic device, the connector array being located and configured to connect with a connector array on the portable function module.

4. The portable electronic device in accordance with claim 1, wherein the at least one device antenna further includes a cellular antenna.

5. The portable electronic device in accordance with claim 1, wherein the controller is further configured to cause the portable function module to participate in a direct RF connection between the portable electronic device and the portable function module when the portable function module is separated from the portable electronic device.

6. The portable electronic device in accordance with claim 5, wherein the direct RF connection is a peer-to-peer WiFi connection.

7. The portable electronic device in accordance with claim 5, wherein the at least one device transceiver and the at least one module transceiver operate at different radio frequencies to maximize the parallel data throughput.

8. The portable electronic device in accordance with claim 1, wherein the controller is further configured to enable the portable function module to maintain an independent connection to a WiFi network when the portable function module is undocked from the portable electronic device.

9. A method of configuring WiFi networking by a portable electronic device, the method comprising:
   detecting docking of a portable function module to the portable electronic device;
   receiving device network information from the portable function module;
   transmitting WiFi network information including at least one WiFi network passcode to the portable function module while the portable function module is docked to the portable electronic communication device; and
   configuring the portable function module to form a parallel WiFi connection with the portable electronic device while the portable function module is docked to the portable electronic device to increase data throughput over that of the portable electronic device alone.

10. The method in accordance with claim 9, wherein detecting docking of a portable function module comprises detecting electrical contact between an interconnect array on the portable function module and an interconnect array on the portable electronic device.

11. The method in accordance with claim 9, further comprising configuring the portable function module to participate in a direct WiFi connection with the portable electronic device when the portable function module is separated from the portable electronic device.

12. The method in accordance with claim 11, further comprising initiating the direct WiFi connection at the portable electronic device when the portable function module is separated from the portable electronic device.

13. The method in accordance with claim 11, further comprising configuring the portable function module to initiate the direct WiFi connection when the portable function module is separated from the portable electronic device.

14. The method in accordance with claim 9, further comprising enabling the portable function module to maintain an independent connection to a WiFi network when the portable function module is undocked from the portable electronic device.

15. A portable electronic communication device for use in a modular device combination, the portable electronic communication device comprising:
   a WiFi transceiver;
   a WiFi antenna;
   a processor configured to detect a second device docking to the portable electronic communication device, the second device having a second WiFi transceiver driving a second WiFi antenna, and to configure the second WiFi transceiver and second WiFi antenna to form a parallel network connection with the WiFi transceiver and WiFi antenna of the portable electronic communication device, the processor being further configured to transmit WiFi network information including at least one WiFi network passcode to the second device while the second device is docked to the portable electronic communication device.

16. The portable electronic communication device in accordance with claim 15, further comprising an interconnect array on a surface of the portable electronic communication device, and wherein the processor is further configured to detect a second device docking to the portable electronic communication device by detecting electrical connectivity between the interconnect array on the surface of the portable electronic communication device and an interconnect array on the surface of the second device.

17. The portable electronic communication device in accordance with claim 15, wherein the parallel network connection utilizes different radio frequencies for the network connections of the portable electronic communication device and second device.

18. The portable electronic communication device in accordance with claim 15, wherein the processor is further configured to cause the second device to form an independent WiFi connection when the second device is disconnected from the portable electronic communication device.

19. The portable electronic communication device in accordance with claim 15, wherein the processor is further configured to create a direct WiFi connection between the portable electronic communication device and the second device when the second device is separated from the portable electronic communication device.

* * * * *